United States Patent [19]

McNeely

[11] 4,280,441
[45] Jul. 28, 1981

[54] TEMPERATURE INDICATOR

[75] Inventor: Gerald W. McNeely, Arden, N.C.

[73] Assignee: Akzona Incorporated, Asheville, N.C.

[21] Appl. No.: 55,241

[22] Filed: Jul. 6, 1979

[51] Int. Cl.³ ............... G01K 11/06; G01K 11/18; G01K 13/00
[52] U.S. Cl. ..................... 116/219; 73/358; 116/217; 252/408
[58] Field of Search ............ 252/408; 73/358, 356; 116/217, 219

[56] References Cited

U.S. PATENT DOCUMENTS

| | | | |
|---|---|---|---|
| 1,535,536 | 4/1925 | MacDonald | 73/356 |
| 1,676,536 | 7/1928 | Ferkel | 73/358 |
| 2,269,038 | 1/1942 | Perry | 73/358 |
| 2,668,126 | 2/1954 | Taylor et al. | 73/358 |
| 3,002,385 | 10/1961 | Wahl et al. | 73/358 |
| 3,047,405 | 7/1962 | Lanier | 73/358 |
| 3,065,083 | 11/1962 | Gessler | 73/356 |
| 3,175,401 | 3/1965 | Geldmacher | 73/356 |
| 3,580,079 | 5/1971 | Crites et al. | 73/358 |
| 3,859,856 | 11/1975 | Keele et al. | 73/356 |
| 3,878,722 | 4/1975 | Crites | 73/358 |
| 3,926,368 | 12/1975 | Geen | 73/356 |
| 4,154,106 | 5/1979 | Inoue et al. | 73/356 |
| 4,232,552 | 11/1980 | Hof et al. | 252/408 |

FOREIGN PATENT DOCUMENTS

| | | | |
|---|---|---|---|
| 2018049 | 11/1971 | Fed. Rep. of Germany | 73/356 |
| 2230890 | 1/1974 | Fed. Rep. of Germany | 73/356 |
| 2738253 | 3/1979 | Fed. Rep. of Germany | 252/408 |

Primary Examiner—Teddy S. Gron
Attorney, Agent, or Firm—Robert H. Falk; Charles A. Wendel; Francis W. Young

[57] ABSTRACT

A temperature indicator including a backing strip with an embossed well stamped therein is provided. The well contains a matrix carrier which is impregnated with a thermally responsive fusible chemical. The bottom of the well is painted a bright color. The impregnated matrix is placed over and substantially covers the colored bottom of the well. The top of the well is covered by a transparent film. At a temperature below a predetermined level, the colored bottom of the well is substantially invisible due to the impregnated matrix being opaque; and at temperatures above such predetermined level, the colored bottom of the well is clearly visible due to the transparency of the impregnated matrix upon melting of the chemical.

12 Claims, 7 Drawing Figures

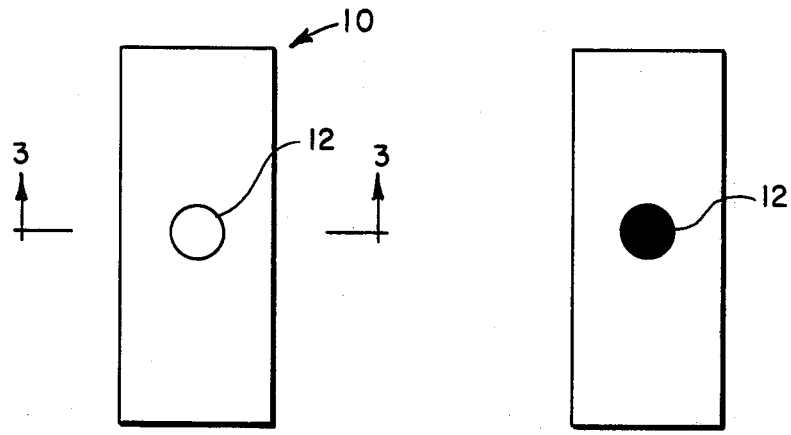
FIG. 1    FIG. 2
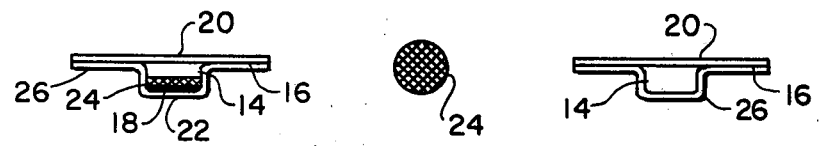
FIG. 3    FIG. 4    FIG. 5
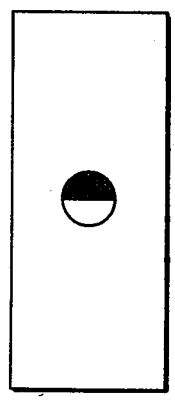
FIG. 7
FIG. 6

TEMPERATURE INDICATOR

BACKGROUND OF THE INVENTION

This invention relates to temperature indicators. More particularly, it relates to high temperature reversible indicators having a dot which changes from an opaque to a transparent mode as a means for indication. It is particularly useful in monitoring leaky steam traps.

Temperature indicators which utilize chemicals changing from an opaque to a transparent mode as they pass from a solid to a liquid phase, have been used in the past particularly in the human clinical thermometer industry. One example of this phenomena is set forth in U.S. Pat. No. 3,859,856, issued to Kay Laboratories. The Kay Laboratory patent shows a human clinical thermometer which has a colored backing with a plurality of chemicals disposed thereon at discreet locations. The chemicals display the characteristic of changing from opaque to transparent upon reaching certain predetermined temperatures corresponding to those in the human clinical range. Thus the colored backing is invisible below predetermined temperatures and becomes visible above such temperatures as the chemicals melt.

Another example of this phenomena is disclosed in U.S. Pat. No. 1,676,536 issued to Carl A. Ferkel. The Ferkel patent discloses a temperature indicating device having 3 compartments which house materials changing from opaque to clear at predetermined temperatures. At the bottom of the compartments are printed the words Warm, Hot and Danger indicating various levels of temperature. The Ferkel device is adapted to be attached to a pipe which may be used in a distillation process.

U.S. Pat. No. 3,580,079 issued to Abbott Laboratories discloses a disposable clinical thermometer including a plurality of windows which are made translucent by roughing its inner surfaces to diffuse light as it passes therethrough. A chemical is provided in cells which are covered by the roughened windows which melts at a predetermined temperature. When the chemicals melt, it comes into contact with the window optically smoothing the window and permitting the bottom of the cell to become visible. Temperature numbers are printed at the bottom of each cell.

U.S. Pat. No. 3,065,083 issued to Albert Gessler discloses a time-delay temperature indicator which includes a grid which is used to prevent the spread of molten materials when the device is activated.

Of particular interest herein is the use of such an indicator to monitor steam traps. The rapidly increasing costs of producing steam has resulted in a renewed interest in efficient steam trapping and better steam trap maintenance. In general, steam traps are devices which collect condensation or water from the steam lines and recirculate the water back to a boiler. Normally, a steam trap is activated when an amount of water accumulates in the trap causing a valve to open for a very short period of time thus permitting the water which has accumulated therein to flow into the return line. A minor amount of steam often escapes the steam line when this valve is open. Problems arise, however, when the valve becomes stuck open. This permits the steam to flow from the steam line into the return water line, resulting in the loss of a great deal of steam. It has been calculated that on 1978 costs for producing steam at 100 psi that a ½ inch leaking line results in a $30,000 per year loss.

In order to eliminate or reduce losses of this type, steam traps must be routinely checked for leaks. Many expensive and time-consuming techniques of monitoring steam traps have been used. Some of these include pressure gauges on steam supply systems and condensate receiver tanks; listening devices such as an industrial stethoscope on the steam trap and portable contact pyrometers for measuring temperatures on both sides of the traps.

Recently, devices have come onto the market which contain a small dot that responds to certain temperatures by changing colors. One example of such a device is the so-called Steam Trap Watchdog manufactured and sold by Reliance Brooks, Inc. This device is a small 1"×4" strip which contains a small dot responding to a specific temperature by changing color. Although the application of the Watchdog device is simple and inexpensive, still this device has a number of deficiencies. For example, the color change of the device is irreversible, the different colors of the indicating dot are not easily discernable from a distance of several feet and as many as 11 different devices are needed to monitor steam line pressures ranging from 40 to 300 psi. In addition to these deficiencies, there are several common steam trapping situations in which a properly functioning steam trap could activate this device. Furthermore, since this device is irreversible the devices must be replaced any time after they are fired. Also, they might easily give a false indication that there is a problem with the steam trap since once they are exposed to the temperatures at which they fire, they continue to indicate that there is a problem. Thus, there is a need for a reversible steam trap monitoring device.

One of the major problems in the use of reversible opaque to transparent thermometers and temperature indicators which have been previously described above, particularly in steam trap monitor applications, is that unless the devices remain horizontal, the chemicals will run to the sides of their holding pocket thus showing a portion of the bottom of the pocket of one color and another portion being opaque. This is a particular problem in the steam trap monitor application where the device might be wrapped around a pipe in a vertical position, so that it is easily read. Of course, absorbent layers could be used as shown in the General Dynamics U.S. Pat. No. 3,059,474; however, this would render the device an irreversible device with all the drawbacks described above. It is, therefore, desirable to provide an improved temperature monitor which takes advantage of the opaque to transparent mode of operation without the accompanying drawbacks.

OBJECT OF THE INVENTION

It is one object of this invention to provide an improved temperature indicator.

It is another object of this invention to provide a reversible temperature indicator which is inexpensive and easily readable.

It is another object of this invention to provide a reversible temperature indicator which is simple in construction.

It is still another object of this invention to provide an improved reversible steam trap monitor.

SUMMARY OF THE INVENTION

In accordance with one form of this invention, there is provided a temperature indicator having a substrate with an embossed well therein. A substantially transparent cover is provided over the well. The bottom of the well is of a readily discernable color. A carrier is received in the well and is impregnated with a chemical. The chemical is solid below a predetermined temperature and liquid above the predetermined temperature. A substantial amount of the chemical remains in the carrier in both the liquid and solid phases. The color of the bottom of the well is visible when the chemical is in its liquid phase and substantially invisible when it is in its solid phase.

BRIEF DESCRIPTION OF THE DRAWINGS

The subject matter which is regarded as the invention is set forth in the appended claims. The invention itself, however, together with further objects and advantages thereof, may be better understood by reference to the following description taken in conjunction with the accompanying drawings in which:

FIG. 1 is a top plan view of the device showing one embodiment of the subject invention where the indicator dot is in its opaque state;

FIG. 2 shows the device of FIG. 1 in which the indicator dot is in its transparent state;

FIG. 3 is a cross-sectional side view of the indicator of FIG. 1;

FIG. 4 shows the matrix carrier as partially shown in FIG. 3;

FIG. 5 is an end elevational view of the indicator of FIG. 1;

FIG. 6 shows an example of an indicator which does not use a carrier matrix and is not a part of this invention.

FIG. 7 shows an alternative carrier to the one shown in FIG. 4.

DESCRIPTION OF THE PREFERRED EMBODIMENT

Referring now more particularly to FIG. 1, there is provided temperature indicator 10 which is particularly adapted to monitor steam traps. The indicator includes indicator chemical 12 which as shown in FIG. 1, is in its opaque stage. The device shown in FIG. 2 shows the indicator dot 12 in its transparent stage, thus showing the bottom of embossed well 14 as shown in FIG. 3. Well 14 may be punched in a thin strip 16 of aluminum or Teflon FEP. The bottom inside of the well 14 is painted a bright color as shown as color layer 18. The thin strip is covered by a optically clear film 20 which may be FEP or a polyimide tape. This tape is transparent so that one may view the inside of the well. If the film 20 and strip 16 are both FEP, then they are readily heat sealed to each other. If an aluminum/polymide system is used, then normally a silicone adhesive will be used to seal the two together.

The device includes a carrier 24 which lays across and substantially covers the colored bottom of the embossment. Carrier matrix 24 is impregnated with a chemical which changes phase such that is goes from the solid phase to the liquid phase at and above a predetermined temperature. The carrier, which is disc shaped, may be made of a material such that light will be refracted and thus maintain an opaque cover over the painted bottom of the indicator. This opacity may be further enhanced by the fact that the chemical 12 impregnated therein may also be opaque in its solid state, and, furthermore, may be of a different index of refraction than the disc carrier 24 such that the light entering into the well will be refracted at different angles going through the boundaries between the carrier and the chemical 12. The preferred disc, shown in FIG. 4, is a Teflon TFE disc made from a mesh sheet of TFE fibers called Specta-Mesh, available from Spectrum Medical Industries, Inc. Another type of disc which has been used is a Whatman Glass Filter Paper, shown in FIG. 7 and available from the Whatman Company. Other types of discs, such as those made of nonwoven polyester, again exemplified in FIG. 7, have also been used.

The chemical which changes phase at a predetermined temperature, in the preferred embodiment, changes in the range of approximately 40° C. to 200° C. which will provide an indication that steam is passing through the steam trap for various steam pressures. One such class of chemicals 12 are alkane hydrocarbons indicated by the general formula $C_nH_{2n+2}$. The preferred hydrocarbons are waxes which are moderated by stable chemicals with sharp melting points. One such wax is Verba-8 wax, available from Dura Commodities Corp. Other types of chemicals 12 which may be used are waxes which are particularly opaque in their solid phase. In order for the color to be very clearly visible, it is best that the liquid phase of the chemical 12 have an index of refraction substantially the same as that of the carrier. Furthermore, the matrix 24 is of such a pore size that it will hold the impregnated chemical 12 in place during both the solid and the liquid phases. That is important for such uses as steam trap monitors where the indicator dot 12 may be in a vertical position. Since the device is reversible, once the chemical 12 has melted, without a carrier matrix 24, it would tend to fall to the sides of the well during the liquid phase and then resolidify in that position leaving a half transparent and half opaque indicator. An example of an indicator which uses an opaque to transparent chemical but not a carrier matrix is shown in FIG. 6. This, of course, could be a source of confusion to the observer. Thus, certain types of porous matrices 24 provide the dual function of holding the thermally responsive chemical 12 in place in both the solid and liquid phase, and provides an opacity while the chemical is in its solid phase due to the refraction of light around the fibers or pores within the matrix 24 which may be further enhanced by the opacity of the chemical 12 selected in its solid phase.

Furthermore, in certain embodiments, the matrix will permit a clearly visible view of the colored bottom of the well when the chemical melts due to the fact that the liquid chemicals have substantially the same index of refraction as the matrix. Below are some examples which incorporate features of the invention.

EXAMPLE I

A small disc cut from Teflon TFE was impregnated with 0.062 grams of Verba-8 wax and then placed in a Teflon FEP well that had a red-colored bottom. The disc was covered with another strip of FEP and the two strips of FEP were heat sealed together. This device was attached in a vertical position to the outside surface of a steam pipe. The temperature of the pipe was slowly increased and the wax melted to a transparent liquid as steam entered the pipe. This liquid caused the TFE disc to become transparent and the red color became visible. The temperature of the pipe was allowed to decrease and the wax was solidified and blocked the red color from view.

EXAMPLE II

A small disc cut from Whatman Glass Filter Paper was treated with 0.028 grams of α,α-dichloro-p-xylene and then placed in an aluminum well that had a red-colored bottom. The disc was covered with a piece of 3M polyimide tape and the pan was then heat sealed to another piece of the same coated aluminum which contained a hole that was slightly smaller than the disc. This device was attached in a vertical position to the outside surface of the steam pipe. The temperature of the pipe was slowly increased and between the temperatures of 105° and 110° C. the α,α-dichloro-p-xylene melted to a transparent liquid. This liquid caused the glass filter paper to become transparent and a red color became visible through the window. The temperature of the pipe was allowed to decrease, and the α,α-dichloro-p-xylene solidified and a white solid was visible to block the red color from view.

The indicator includes a layer of adhesive 26 which is attached to the bottom of the device so that it may be readily attached to a pipe in a steam trap. One adhesive which has been used is Densil 2078, available from Dennison Company.

From the foregoing description of the embodiments of the invention, it will be apparent that many modifications may be made therein. It will be understood, however, that these embodiments of the invention are intended as exemplifications of the invention only and that the invention is not limited thereto. It will be understood, therefore, that it is intended in the appended claims to cover all modifications as fall within the true spirit and scope of the invention.

I claim:

1. A reversible steam trap temperature indicator, comprising:
    (a) a substrate having an embossed well therein;
    (b) a substantially transparent cover over said well, the bottom of said well being a detectable color;
    (c) a porous or fibrous carrier received in said well, said carrier voids impregnated with a chemical which is solid below a predetermined temperature and liquid above said predetermined temperature, said carrier adapted to refract light to maintain an opaque cover over the painted bottom of said indicator at least when said chemical is solid;
    (d) a substantial amount of said chemical remaining in said carrier in both liquid and solid phases, and the color of the bottom of said well being visible when said chemical is in its liquid phase and substantially invisible when it is in its solid phase.

2. The device as set forth in claim 1 wherein the chemical is a hydrocarbon.

3. The device as set forth in claim 1 wherein said chemical changes from opaque to transparent at said predetermined temperature.

4. The device as set forth in claim 1, wherein the combination of the carrier and the chemical caused the visibility and invisibility of said colored bottom.

5. The device as set forth in claim 1 wherein said carrier is optically opaque when said chemical is solid and optically smooth and thus transparent when said chemical is liquid.

6. The indicator set forth in claim 2 wherein said hydrocarbon is of the general formula $C_nH_{2n+2}$.

7. The device as set forth in claim 1 wherein said chemical is α,α-dichloro-p-xylene.

8. The indicator as set forth in claim 1, wherein said carrier contains pores of such dimension so as to hold said chemical therein during its liquid phase.

9. A temperature indicator, comprising:
    (a) a substrate having an embossed well therein;
    (b) a substantially transparent cover over said well, the bottom of said well being a detectable color;
    (c) a carrier received in said well, said carrier impregnated with a chemical which is solid below a predetermined temperature and liquid above said predetermined temperature, wherein said carrier is a matrix containing pores of such dimension so as to hold said chemical therein during its liquid phase, and wherein said carrier matrix is a TFE disc; and
    (d) a substantial amount of said chemical remaining in said carrier in both liquid and solid phases, and the color of the bottom of said well being visible when said chemical is in its liquid phase and substantially invisible when in its solid phase.

10. The device as set forth in claim 1, wherein said carrier is a glass filter paper.

11. The device as set forth in claim 1 wherein said carrier is non-woven polyester.

12. The device as set forth in claim 1, wherein the indicator is a steam trap monitor.

* * * * *